United States Patent [19]

Sumi et al.

[11] Patent Number: 5,722,152
[45] Date of Patent: Mar. 3, 1998

[54] METHOD OF ASSEMBLING A STATOR FOR AN ELECTRIC MOTOR

[75] Inventors: Masatomo Sumi; Shigeo Inaki, both of Takefu, Japan

[73] Assignee: Matsushita Electric Industrial Co., Ltd., Osaka, Japan

[21] Appl. No.: 594,396

[22] Filed: Jan. 31, 1996

Related U.S. Application Data

[63] Continuation of Ser. No. 148,556, Nov. 8, 1993, abandoned.

[30] Foreign Application Priority Data

Nov. 30, 1992 [JP] Japan ................................. 4-319662

[51] Int. Cl.$^6$ ................................................. H02K 15/02
[52] U.S. Cl. ..................................... 29/596; 310/42
[58] Field of Search .................... 29/296, 598; 310/42, 310/216, 217, 218

[56] References Cited

U.S. PATENT DOCUMENTS

| | | | |
|---|---|---|---|
| 2,711,008 | 6/1955 | Smith | 29/596 |
| 3,175,277 | 3/1965 | Brown et al. | 29/596 |
| 3,869,629 | 3/1975 | Ogawa et al. | 310/216 |
| 4,496,863 | 1/1985 | Sawatani | 310/61 |
| 4,912,353 | 3/1990 | Kondo et al. | 310/259 |

FOREIGN PATENT DOCUMENTS 0881468  11/1961  United Kingdom ................ 310/216

*Primary Examiner*—Carl E. Hall
*Attorney, Agent, or Firm*—Watson Cole Stevens Davis, P.L.L.C.

[57] ABSTRACT

In assembling a stator being divided into a pole portion and a yoke portion and provided with a winding on the insulated pole portion, the yoke portion is forcibly enlarged outwardly, whereafter the tip ends of the projections of the pole portion are fitted in the recesses of the yoke portion. The two opposing surfaces of each recess are made parallel to each other and the bottom surface of the recess is made parallel to the outer peripheral surface of the yoke portion. The thickness of a portion existing between the bottom surface and the outer peripheral surface is not exceeding 3% of the diameter of the yoke portion and is not less than the thickness of an iron plate of the laminated iron core, whereby the press-fitting load applied when the pole portion is fitted into the yoke portion enlarged is reduced. Thus, even a large-sized stator iron core can readily be assembled and an electric motor of improved properties and enhanced output obtained.

4 Claims, 4 Drawing Sheets

METHOD OF ASSEMBLING A STATOR FOR AN ELECTRIC MOTOR

This application is a division of application Ser. No. 08/148,556, filed Nov. 8, 1993 (abandoned).

BACKGROUND OF THE INVENTION

1. Field of the Invention

The present invention relates to a method of assembling a stator for an electric motor, having a stator iron core comprising a magnetic pole portion (hereinafter referred to as "pole portion") and a cylindrical yoke portion, and also relates to a stator iron core therefor.

2. Description of the Prior Art

Heretofore, a motor stator having a stator iron core of this sort has been structured as illustrated in FIG. 6. As illustrated, a pole portion 2 has a plurality of teeth 1 as magnetic poles the inner parts of which are connected in the form of a ring. On the two end surfaces of each tooth 1 and three wall surfaces of the slot 4 existing between the adjacent two teeth 1, resinous insulating layers 6 are formed by molding. A winding 7 is then applied on these insulating layers 6, whereupon the respective end parts of the teeth 1 are fitted into the corresponding grooves formed at the inner surface of a cylindrical yoke portion 3 which acts as a magnetic path to constitute a desired stator assembly.

This conventional stator assembly is effective in facilitating the winding operation since a winding 7 can be directly wound exteriorly of such open-form pole portion 2.

However, as in the prior art, when the yoke portion is press-fitted exteriorly to the pole portion after it is insulated and provided with the winding, a large mechanical resistance is developed mutually between the tip end of the individual tooth of the pole portion and the corresponding groove of the yoke portion. Then, burrs or the like occur at the engaging portions of the tip ends of the teeth of the pole portion and the grooves of the yoke portion, thereby necessitating an increased press-fitting force in order for the yoke portion to be fitted, and deteriorating the dimensional accuracy of the inner contour of the pole portion. In addition, the winding tends to be scratched by the burrs or the like to produce a failure of insulation or a breakage of the winding, also creating a failure in the required stator properties.

SUMMARY OF THE INVENTION

The present invention is made in order to resolve the foregoing problems and has its object to provide a method of assembling a stator for an electric motor and a stator iron core to be used therein wherein the winding operation can be facilitated, a large press-fitting load is made unnecessary when the pole and yoke portions are fixed together, and the deterioration of the dimensional accuracy, the insulation failure and the breakage of the winding or the like are eliminated.

In order to achieve the object stated above, according to the present invention, a stator iron core comprises a pole portion which has a plurality of radially salient projection the inner portions of which are connected continuously in the form of a ring and is provided with a winding, and a cylindrical yoke portion which has a plurality of recesses and is to surround the pole portion, wherein the cylindrical yoke portion is forcibly enlarged and is fixed on the tip end of the projections of the pole portion.

Further, the configuration of each individual recess of the yoke portion is such that its radially extending two wall surfaces are substantially parallel to each other and its remaining bottom surface extending perpendicular to the radial direction is substantially parallel to the external peripheral surface of the yoke portion and the thickness of the portion existing between two adjacent teeth is not less than that of one iron plate of the laminated iron core of the yoke portion and is not exceeding 3% of the diameter of the yoke portion.

By such forcibly enlarging of the cylindrical yoke portion and then fitting it on the pole portion which has been already formed with insulating portions and provided with a winding, the mutual fitting resistance between the tip ends of the projections of the pole portion and the recesses of the yoke portion when these portions are fitted together is rendered smaller so that the occurrence of burrs or the like at the tip ends of the projections of the pole portion and the recesses of the yoke portion can be eliminated, the fitting load needed when these portions are fitted together is made small, the deterioration of the dimensional accuracy of the inner diameter of the pole portion as well as the possible damage of the winding due to the burrs or the like otherwise created can be prevented and the obstruction such as the insulation failure, the winding breakage and the failure in the desired stator properties can be eliminated.

Further, by making the two radially extending surfaces of each individual recess of the yoke portion substantially parallel to each other and making thin the portion (hereinafter referred to as "bridge portion") formed between the outer periphery of the yoke portion and the bottom surface of the recess, the mutual interference of the pole and yoke portions to be fitted together can be made small by such forcibly enlarging of the yoke portion, regardless of any dimensional change which may be caused when the tip ends of the projections of the pole portion and the recesses of the yoke portion are simultaneously cut with a punching die. In addition, since the mutual fitting resistance between the projections of the pole portion and the recesses of the yoke portion can be made smaller, even a stator iron core of the pole and yoke portions with an increased thickness can readily be fixed. Besides, since the failure in fitting can be prevented, an electric motor of an enhanced output and improved properties can be obtained.

DETAILED DESCRIPTION OF THE INVENTION

Hereinafter, an embodiment of a stator for an electric motor in accordance with the present invention will now be described with reference to the drawings.

Figure 1:
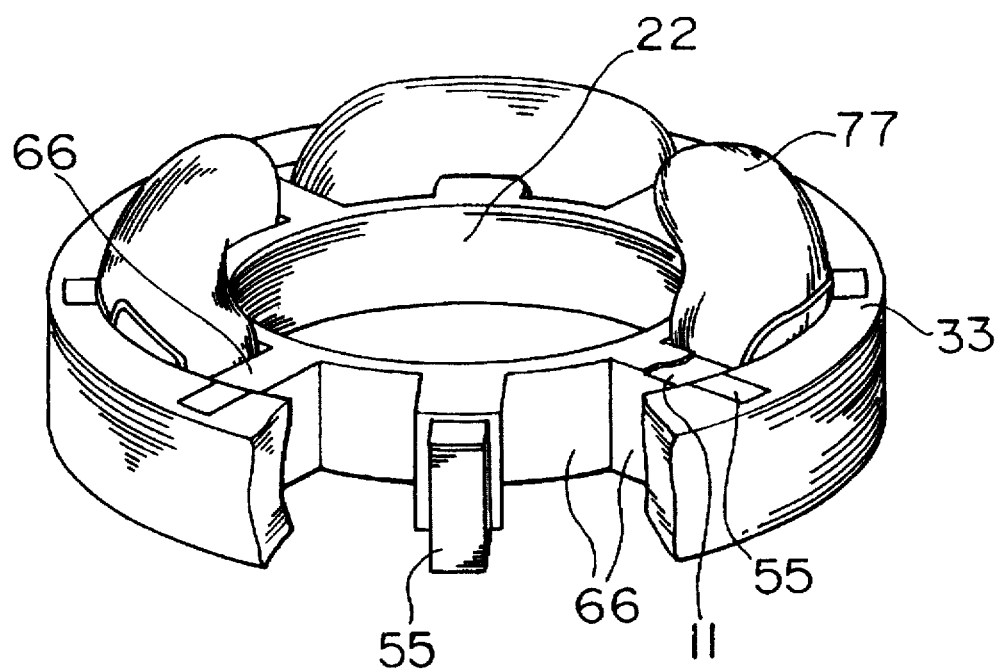
FIG. 1 is an exterior perspective view, partly broken, illustrating an embodiment of the present invention.
Figure 2:
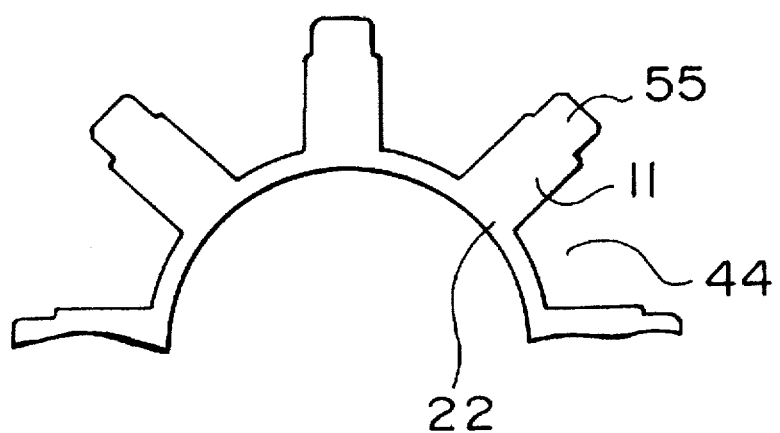
FIG. 2 is a partial top plan view illustrating the pole portion of a stator in the embodiment of the present invention.
Figure 3:
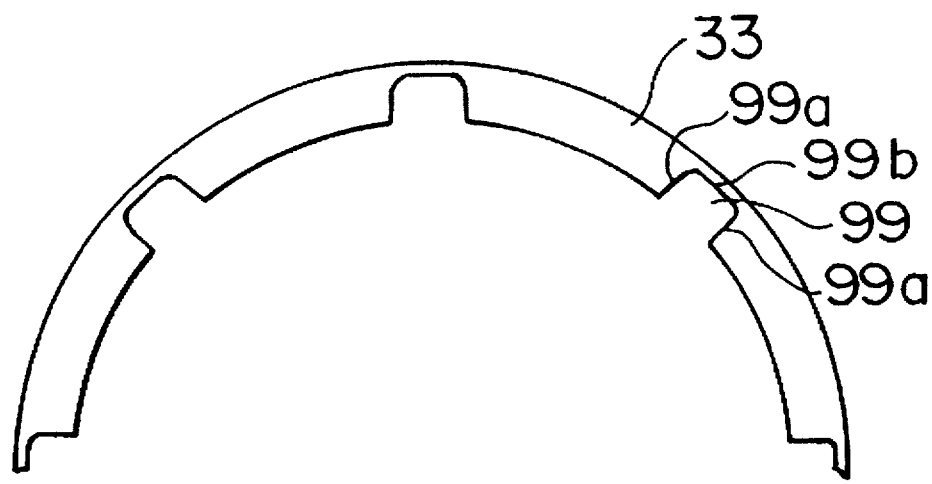
FIG. 3 is a partial top plan view illustrating the yoke portion of the stator in the embodiment of the present invention.

FIG. 1 is an exterior perspective view, partly broken, showing a stator for an electric motor according to the present invention, and FIGS. 2 and 3 are partial top plan views of its pole portion and yoke portion, respectively. The stator comprises a pole portion 22 which has a plurality of radially salient projections 11, the inner portions of which are connected continuously in the form of a ring, and is provided with a winding 77 with interposition of insulating portions 66 and a cylindrical yoke portion 33 which fittedly surrounds the pole portion 22. The fixing of the pole portion 22 with the yoke portion 33 is so accomplished that the tip ends 55 of the projections 11 of the pole portion 22 are inserted into the corresponding recesses 99 of the yoke portion 33, respectively.

Next, it will be described how the pole portion 22 is fixed with the yoke portion 33 to assemble the motor stator.

Figure 4:
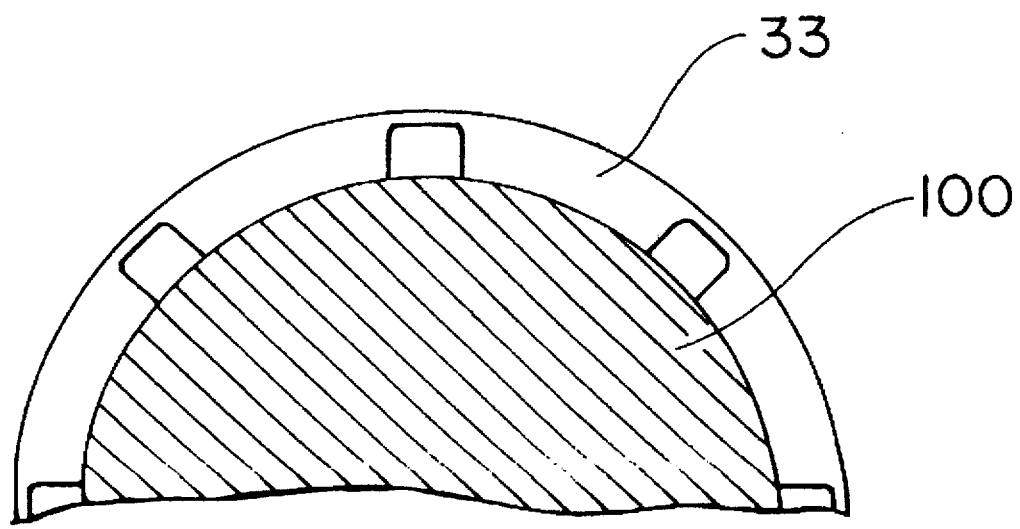
FIG. 4 is a partial top plan schematic view illustrating the forcible enlargement of the yoke portion of FIG. 3.
Figure 5:
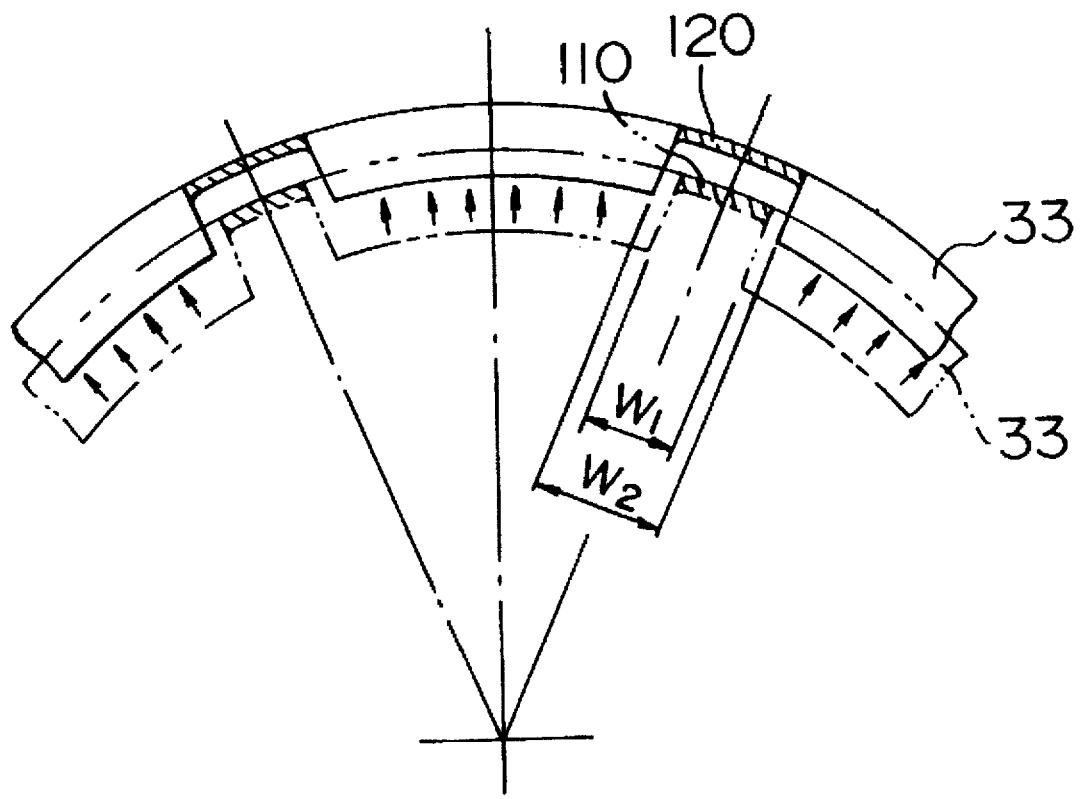
FIG. 5 is a partial top plan schematic view illustrating that the widths of individual recesses of the yoke portion to be fitted on the respective tip ends of the projections of the pole portion are enlarged when the yoke portion of FIG. 3 is forcibly enlarged.
Figure 6:
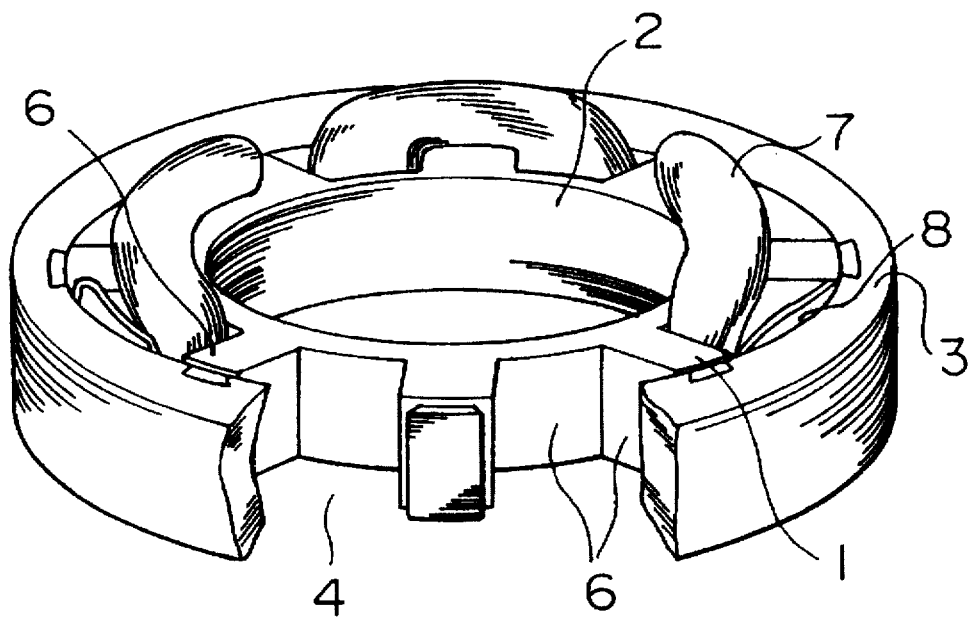
FIG. 6 is an exterior perspective view, partly broken, illustrating a motor stator assembled by the conventional assembling method; of the prior art
Figure 7:
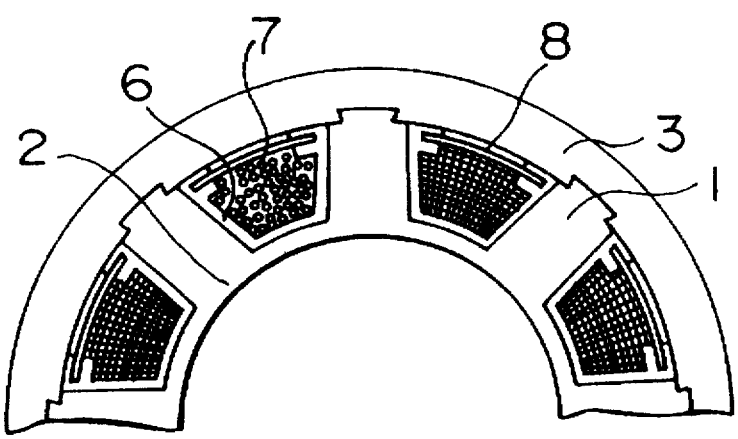
FIG. 7 is a partial cross-sectional view cut in the radial direction illustrating the stator assembled by the conventional assembling method of the prior art.

FIG. 4 illustrates the state in which a jig 100 is press-fitted in the yoke portion 33 to forcibly enlarge or expand the latter, and FIG. 5 shows the states of the yoke portion 33 before and after its enlargement or expansion. By way of such enlargement or expansion, a bridge portion 110 at each individual recess 99 of the yoke portion 33 into which the tip end 55 of the corresponding individual projection 11 of the pole portion 22 is to be fittedly inserted is enlarged or expanded as shown by the numeral 120 so that the width W1 of each recess 99 with which the tip end 55 of the corresponding projection 11 is to be fitted is enlarged to W2, whereafter the tip ends 55 of the projections 11 of the pole portion 22 having been provided with the winding 77 with interposition of the insulators 66 are inserted into the recesses 11 of the yoke portion 33.

In this way, as the cylindrical yoke portion 33 with the recesses 99 is forcibly expanded outwardly, it is possible that the pole portion 22 which has a plurality of radially salient projections 11 whose inner portions are connected continuously in the form of a ring and the cylindrical yoke portion 33 to be adapted to surround the pole portion 22 are readily assembled to constitute a motor stator iron core.

Next, a description will now be made with respect to the configuration of each individual recess 99 of the yoke portion 33.

As regards the configuration of each individual recess 99 of the yoke portion 33, it is necessary that the three wall surfaces of the recess 99 into which the tip end 55 is fitted be uniformly extended in order for the fitting resistance to be reduced. To this end, the two opposing surfaces 99a, 99a radially extending should be substantially parallel to each other and the remaining bottom surface 99b should be substantially parallel to the adjacent peripheral surface of the yoke portion 33. More specifically, if the two opposing surfaces 99a, 99a are not parallel to each other, when the forcible expansion jig 100 is press-fitted, since the inner periphery of the yoke portion 33 will expanded before the bridge portion 110 is expanded and the peripheral dimension of the yoke portion 33 will remain unexpanded, the interference perpendicular to the outer periphery becomes large and the fitting resistance becomes large, and, the interference of the surfaces 99a, 99a becomes, conversely, small or zero so that an unbalanced fitting condition may develop and smooth-fitting operation is disturbed.

Further, when the thickness of the bridge portion 110 existing between the recess 99 and the adjacent peripheral surface of the yoke portion 33 is not uniform, the stress arising from the forcible press-fitting of the jig 100 will concentrate at a thinner region of the bridge portion 110 and the bridge portion 110 will not be expanded uniformly. This will cause deformation of the recess 99 and will bring about non-uniform interference and results in an increased fitting resistance. Accordingly, the required configuration of each recess 99 of the yoke portion 33 is such that the two opposing surfaces radially extending should be substantially parallel to each other and the remaining bottom surface perpendicular to the radial direction should be substantially parallel to the adjacent outer peripheral surface to ensure a uniformity of the thickness of the bridge portion 110.

Furthermore, there is an adequate range in the thickness of the bridge portion 110 existing between the recess 99 and the outer peripheral surface of the yoke portion 33, because, if it is too thick, it will become difficult for the jig 100 to be press-fitted, and, if an attempt is then made to press-fit the jig 100 with an excessive load, a burning may ensue therein. In one embodiment of the stator iron core according to the present invention, the bridge portion 110 has a thickness of 1.2 mm while the yoke portion 33 has a diameter of 94 mm. However, as a result of our investigation, it has been confirmed that the upper limit of the thickness of the bridge portion 110 which does not cause such a burning is 3% of the diameter of the yoke portion 33, and its lower limit may be equal to the thickness of an iron plate which can be treated by a punch cutting die in mass production.

According to the present invention, by forcibly enlarging or expanding a cylindrical yoke portion with recesses outwardly, the yoke portion can readily be fitted on the tip ends of the projections of a pole portion. Further, by dimensioning the thickness of a bridge portion formed between the recess of the yoke portion and its adjacent peripheral surface thereof in the range between the value equal to the thickness of an iron plate and 3% of the diameter of the yoke portion, making the opposing surfaces of the recess of the yoke portion to be in engagement with the tip end of the corresponding projection of the pole portion substantially parallel to each other and making the bottom surface of the recess substantially parallel to the outer peripheral surface of the yoke portion, it is made possible to reduce the fitting load when the yoke portion is fitted and to prevent the deterioration of the dimensional accuracy of the inner diameter of the pole portion, and it is made possible that the problems of the failure of insulation and the winding breakage due to a damage in the winding by burrs or the like are eliminated. Thus, the present invention achieves a marked progress in productivity of motor stators and is applicable to even a larger-sized stator iron core hitherto essentially impractical, by virtue of the improved assembling method.

We claim:

1. A method of assembling a stator for an electric motor, the method comprising the steps of:

forcibly enlarging outwardly, by means of a jig, a cylindrical yoke portion of a stator iron core which is to be formed by a pole portion having a plurality of radially salient projections, the projections having inner parts which are connected to form a ring, and the cylindrical yoke portion having a plurality of recesses and a plurality of bridge portions and being adapted to surround the pole portion; and inserting the projections of the pole portions into the recesses of the enlarged yoke portion.

2. A method according to claim 1, wherein:

the cylindrical yoke portion has an outer peripheral surface; and each of the plurality of recesses has (i) a bottom surface which is substantially parallel to an adjacent portion of the outer peripheral surface, a respective one of the bridge portions being disposed between the bottom surface and the adjacent portion of the outer peripheral surface, and (ii) a pair of opposing surfaces which are parallel to each other.

3. A method according to claim 2, wherein each of the bridge portions has a thickness, measured between the bottom surface of a respective one of the recesses and the adjacent portion of the outer peripheral surface, which is no greater than 3% of a diameter of the cylindrical yoke portion.

4. A method according to claim 2, wherein, in each of the plurality of recesses, the pair of opposing surfaces have a separation of W1 when the cylindrical yoke portion is not forcibly enlarged by means of the jig and a separation of W2 when the cylindrical yoke portion is forcibly enlarged by means of the jig, wherein W2>W1, and wherein W2 is sufficiently large to accommodate the projections.

* * * * *